(12) United States Patent
Watanabe et al.

(10) Patent No.: US 7,487,615 B2
(45) Date of Patent: Feb. 10, 2009

(54) RUN CHANNEL STRUCTURE

(75) Inventors: Hakurei Watanabe, Wako (JP); Jiro Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 683 days.

(21) Appl. No.: 11/048,980

(22) Filed: Feb. 2, 2005

(65) Prior Publication Data

US 2005/0166459 A1 Aug. 4, 2005

(30) Foreign Application Priority Data

Feb. 4, 2004 (JP) ............................. 2004-028580

(51) Int. Cl.
*E06B 7/16* (2006.01)
(52) U.S. Cl. ..................... 49/441; 49/440; 49/428; 49/489.1; 49/477.1
(58) Field of Classification Search ............... 49/489.1, 49/495.1, 477.1, 498.1, 440, 441, 428
See application file for complete search history.

(56) References Cited

U.S. PATENT DOCUMENTS

| | | | | |
|---|---|---|---|---|
| 5,209,019 A * | 5/1993 | Morita | ...................... | 49/490.1 |
| 5,548,929 A * | 8/1996 | Larsen et al. | ................. | 49/441 |
| 5,651,217 A * | 7/1997 | Mesnel | ........................ | 49/441 |
| 6,409,251 B1 * | 6/2002 | Kaye et al. | ............... | 296/146.9 |
| 6,641,204 B2 * | 11/2003 | Ogawa et al. | ............ | 296/146.9 |
| 6,972,140 B2 * | 12/2005 | Watanabe | .................. | 428/36.9 |
| 2001/0015035 A1 * | 8/2001 | Nozaki | ........................ | 49/440 |
| 2002/0056234 A1 * | 5/2002 | Tanaka et al. | ................. | 49/375 |

FOREIGN PATENT DOCUMENTS

| | | |
|---|---|---|
| JP | 04-037016 | 3/1992 |
| JP | 09-104236 | 4/1997 |
| JP | 2003-072383 | 3/2003 |
| WO | 97/27377 | 7/1997 |

\* cited by examiner

*Primary Examiner*—Gregory J. Strimbu
(74) *Attorney, Agent, or Firm*—Rankin, Hill & Clark LLP

(57) ABSTRACT

A run channel in an automobile door includes a U-shaped run channel body. An inner lip extends from a bottom end portion of an inner wall of the run channel body towards a peak portion. An upper lip is formed above the inner lip and extends from an intermediate portion of the inner wall to the peak portion. When a door glass abuts on the inner lip, the door glass presses the inner lip towards the inner wall to cause a distal end portion of the inner lip to press on the upper lip, whereby a reaction force of the upper lip is applied to the distal end portion of the inner lip. The inner lip in turn produces a reaction force slowing upward movement of the door glass, causing its upper edge to slowly abut on the peak portion of the run channel, thus reducing a glass striking sound.

9 Claims, 7 Drawing Sheets

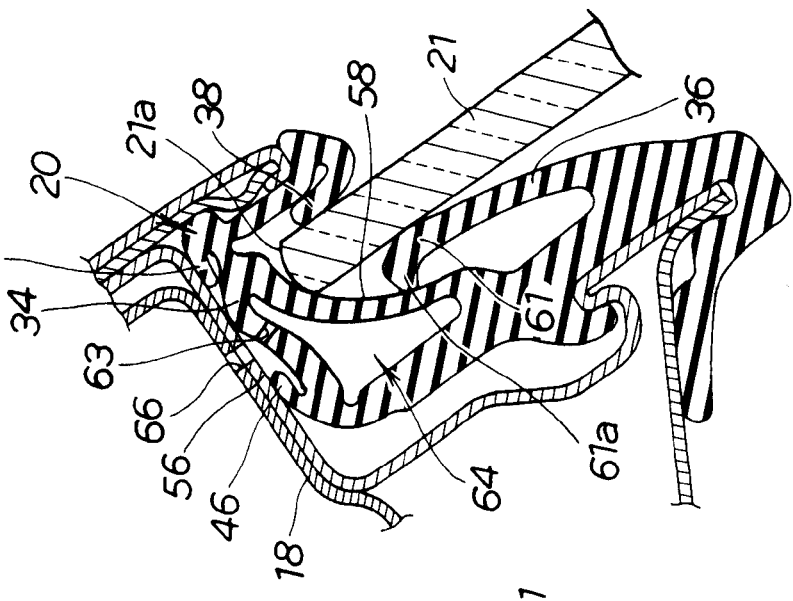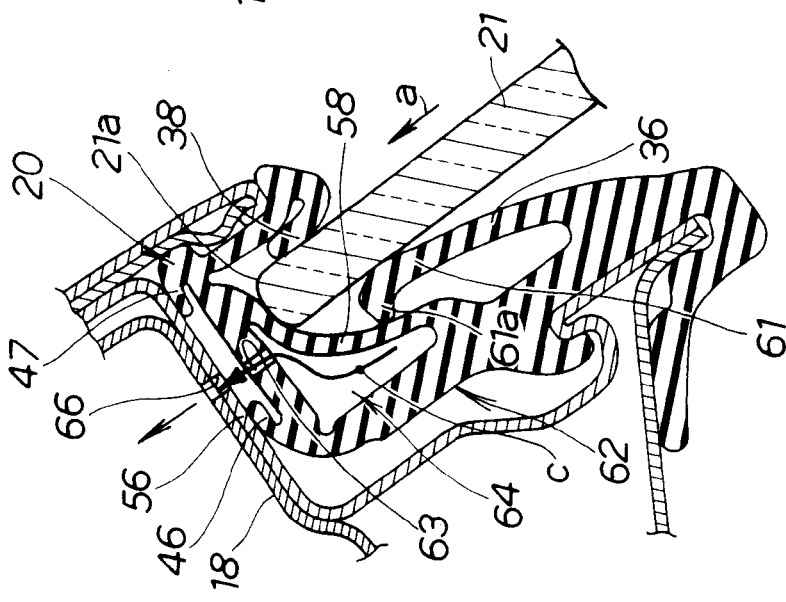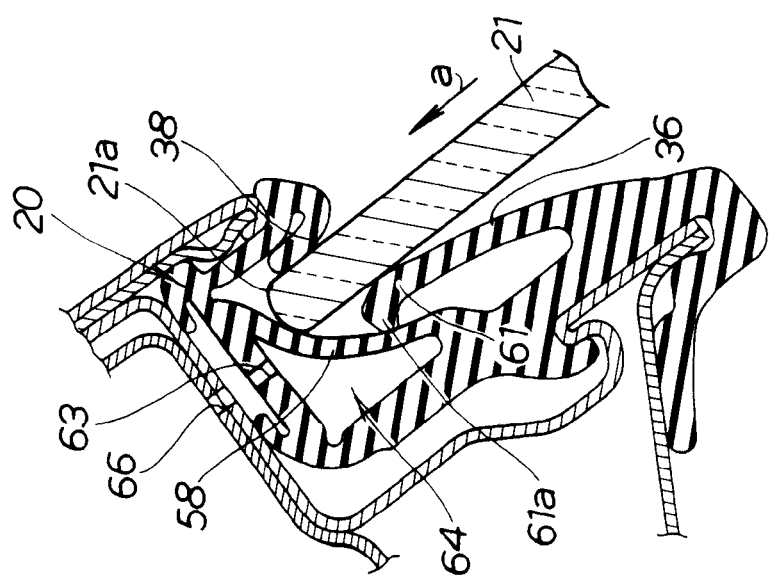

Comparative Example

Comparative Example

Comparative Example

RUN CHANNEL STRUCTURE

FIELD OF THE INVENTION

The present invention relates generally to a run channel structure and, in particular, to a run channel structure including a run channel body for receiving an edge portion of a door glass, and inner and outer lips provided to the run channel body.

BACKGROUND OF THE INVENTION

Door glass ascent/descent systems include window regulators for moving door glasses of vehicles upward or downward. The door glass is moved upward by the window regulator for closing a window of a vehicular door. When the door glass is moved upward and then an upper edge of the door glass hits a run channel, the door glass is prevented from moving further upward. At this time, a load exceeding a threshold level is applied to the window regulator. Such an excessive load is detected to thereby stop an operation of an electric motor with the result that the door glass stops at a closed position (i.e., at an uppermost position).

The above run channel is attached to a window sash of a front side door, as disclosed in, for example, JP-A-2003-72383.

The disclosed run channel has a U-shaped cross-sectional configuration formed by an inner wall, an outer wall and a peak portion. Inner and outer lips extend from the inner and outer walls for sealing engagement with inner and outer surfaces of the door glass, respectively.

As for the run channel, a window regulator raises the door glass and thereby presses an upper edge of the door glass against the peak portion of the run channel. With the upper edge of the door glass thus pressed against the peak portion, the door glass is not raised any more and a load exceeding a threshold level is applied to the window regulator. Such an excessive load is detected to thereby stop an operation of an electric motor with the result that the door glass stops at a closed position (i.e., an uppermost position).

As for the run channel, a problem arises that the window regulator raises and strikes the upper edge of the door glass onto the peak portion of the run channel at a predetermined speed whereupon an unpleasant strike sound is produced.

There has been a demand for a run channel arranged to reduce a strike sound of the door glass when the door glass moves to the closed position.

SUMMARY OF THE INVENTION

According to one aspect of the present invention, there is provided a run channel structure for guiding a door glass, comprising: a run channel body of generally U-shaped cross-section, the run channel body including an inner wall, an outer wall and a peak portion interconnecting top end portions of the inner and outer walls; an inner lip extending from a bottom end portion of the inner wall towards the peak portion; an outer lip extending from a bottom end portion of the outer wall towards the peak portion; an upper lip disposed above the inner lip and extending from an intermediate portion of the inner wall to the peak portion; and wherein, when the door glass abuts on the inner lip, the door glass presses the inner lip towards the inner wall to cause a distal end portion of the inner lip to press the upper lip.

When the door glass abuts on the inner lip, the door glass presses the inner lip towards the inner wall to thereby cause the distal end portion of the inner lip to press the upper lip. By the distal end portion of the inner lip thus pressing the upper lip, a reaction force of the upper lip is applied to the distal end portion of the inner lip to thereby make relatively large a reaction force of the inner lip to be applied to the door glass. By virtue of such a relatively large reaction force of the inner lip, an ascent speed of the door glass is satisfactorily reduced. Thus, an upper edge of the door glass relatively slowly abuts on the peak portion of the run channel structure while a reduced glass strike sound of the door glass is produced. The term "glass strike sound" as used herein means a sound produced when the upper edge portion of the door glass abuts on the peak portion of the run channel structure.

Preferably, the upper lip, the inner wall and the peak portion jointly define a hollow cross-sectional portion of generally triangular configuration. Namely, the upper lip is one side of the hollow cross-sectional portion of the generally triangular configuration with opposite ends of the upper lip supported. With this arrangement, a relatively large reaction force of the upper lip is securely produced when the distal end portion of the inner lip presses the upper lip. Such a relatively large reaction force of the upper lip is applied to the distal end portion of the inner lip to thereby cause the inner lip to produce a sufficient reaction force to be applied to the door glass. The application of the reaction force of the inner lip to the door glass satisfactorily reduces the ascent speed of the door glass with the result that the upper edge portion of the door glass relatively slowly abuts on the peak portion of the run channel structure.

Desirably, after the distal end portion of the inner lip presses the upper lip, the upper edge portion of the door glass abuts on the upper lip. Accordingly, it becomes possible to reduce the ascent speed of the door glass through the two steps, thereby causing the upper edge portion of the door glass to relatively slowly abut on the peak portion of the run channel structure. In addition, since the upper lip forms the one side of the hollow cross-sectional portion of the generally triangular configuration, an internal pressure within the hollow cross-sectional portion increases when the distal end portion of the inner lip presses the upper lip. This enables the upper lip to act as a cushion more effectively for producing a relatively large reaction force. Therefore, the ascent speed of the door glass is further satisfactorily reduced by the upper lip when the door glass abuts on the upper lip, with the result that the upper edge of the door glass relatively slowly abuts on the peak portion of the run channel structure.

Preferably, the hollow cross-sectional portion has an air releasing hole through which an inner space of the hollow cross-sectional portion communicates with the air. Thus, the internal pressure within the hollow cross-sectional portion can be easily adjusted and hence the reaction force of the upper lip and the reaction force of the inner lip to be applied to the door glass can be adjusted. This enables the satisfactory adjustment of the ascent speed of the door glass, such that the upper edge of the door glass abuts on the peak portion of the run channel structure at a preferable speed.

Preferably, the inner lip is formed to provide a greater size than the outer lip so as to facilitate an adjustment of a reaction force of the inner lip to be applied to the door glass when the door glass abuts on the inner lip. Thus, the inner lip can be relatively easily varied in configuration for easy adjustment of the reaction force of the inner lip to be applied to the door glass. By virtue of the inner lip, the ascent speed of the door glass can be satisfactorily adjusted, such that the upper edge of the door glass abuts on the peak portion of the run channel structure at a preferable speed.

BRIEF DESCRIPTION OF THE DRAWINGS

A certain preferred embodiment of the present invention will hereinafter be described in detail, by way of example only, with reference to the accompanying drawings, in which:

FIG. 6A through FIG. 6C are views showing how the door glass is inserted into the run channel structure according to the present invention.

DETAILED DESCRIPTION OF THE PREFERRED EMBODIMENTS

Figure 1:
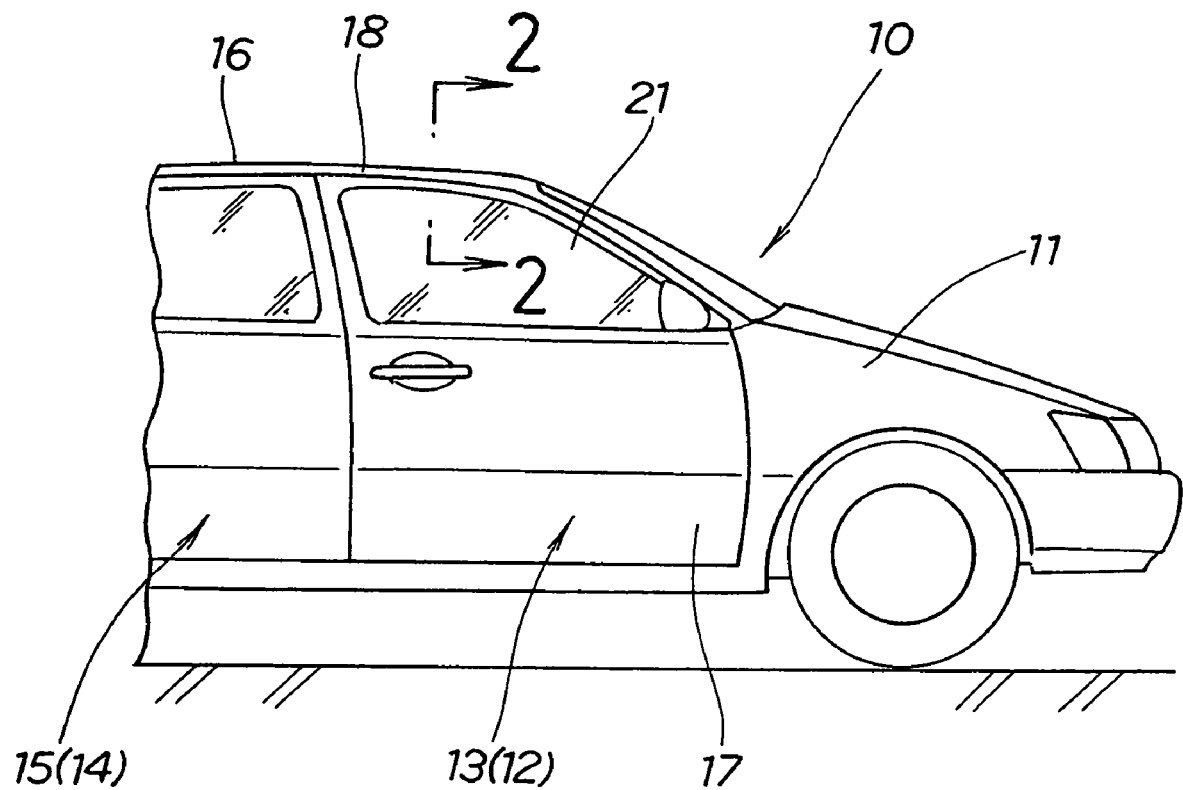
FIG. 1 is a side elevation view of a vehicle including a run channel structure according to the present invention.

A vehicle 10 shown in FIG. 1 includes a vehicle body 11 equipped with left and right front sash doors 12, 13 and left and right rear sash door 14, 15. The vehicle body 11 has a roof 16 disposed over the left and right front sash doors 12, 13 and the left and right rear sash doors 14, 15.

The right front sash door 13 includes a door body 17, a sash body 18 provided on an upper part of the door body 17, and a run channel structure 20 (see FIG. 2) provided in the sash body 18. The right front sash door 13 also includes a door glass 21.

It is to be noted that the left and right front sash doors 12, 13 have the same structure and are symmetrically disposed while the left and right rear sash doors 14, 15 have the same structure and are symmetrically disposed.

Figure 2:
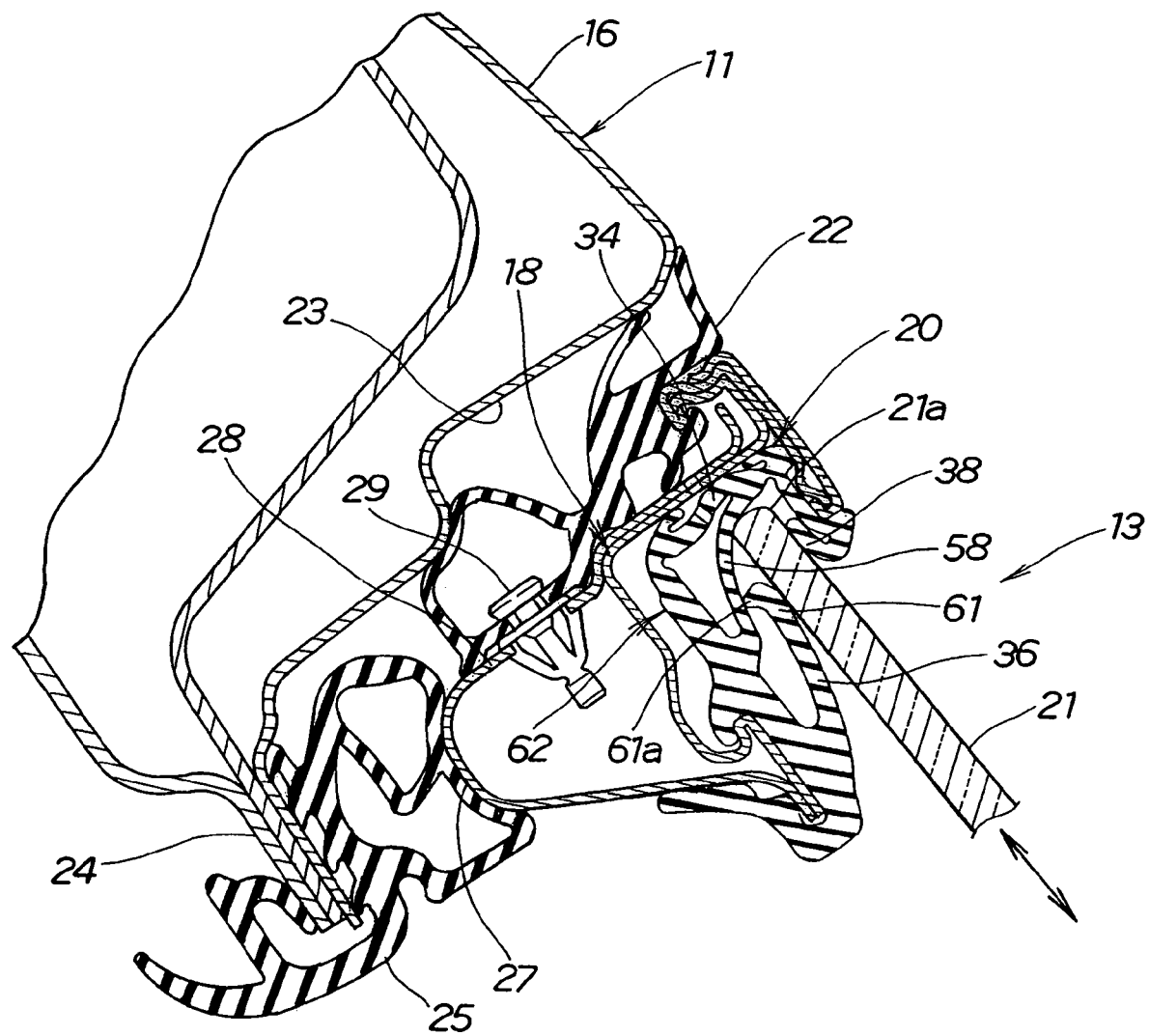
FIG. 2 is a cross-sectional view taken along line 2-2 of FIG. 1.

FIG. 2 shows the right front sash door 13 in a closed position.

The sash body 18 of the right front sash door 13 is equipped with a weatherstrip 22 and the run channel structure 20. The vehicle body 11 has a door opening part 23 provided therein for accommodating the sash body 18. The door opening part 23 has an edge portion 24 to which a vehicle body side weatherstrip 25 is attached.

The weatherstrip 22 is attached to an outer peripheral wall 28 of the sash body 18 by means of a clip 29.

When the right front sash door 13 is in the closed position, that is, when the sash body 18 is accommodated in the door opening part 23, an inner wall portion 27 of the sash body 18 contacts the vehicle body side weatherstrip 25 while the weatherstrip 22 contacts the door opening part 23. The weatherstrip 22 and the vehicle body side weatherstrip 25 thus arranged seal a gap between the door opening part 23 of the vehicle body 11 and the sash body 18.

The run channel structure 20 is attached to the inside of the sash body 18. When the door glass 21 slides in a direction of an arrow (an up-and-down direction), the run channel structure 20 guides the door glass 21 and is in a sealing engagement with the door glass 21.

Figure 3:
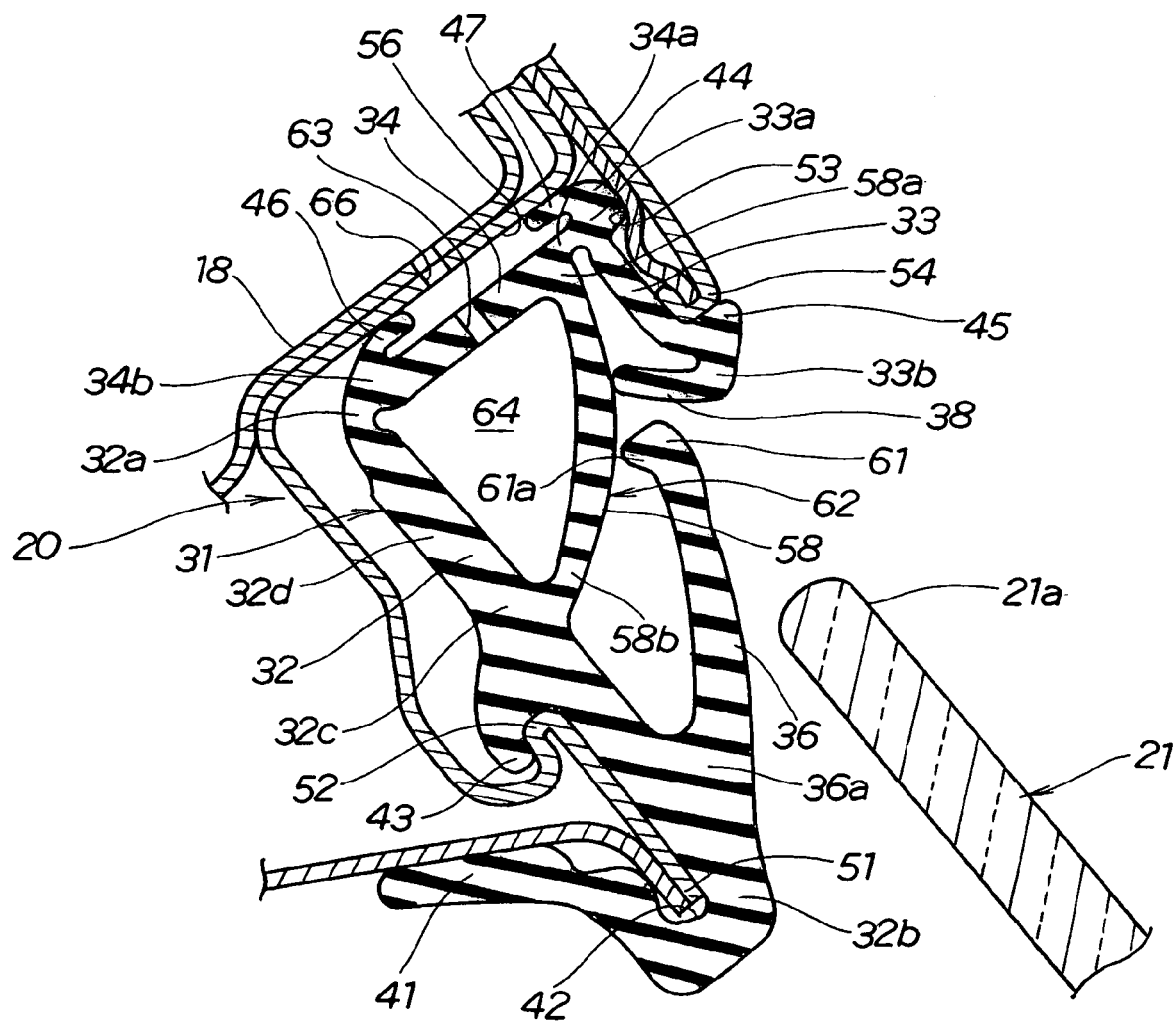
FIG. 3 is a view showing in cross-section the run channel structure and a door glass released from the run channel structure.

FIG. 3 shows the run channel structure with the door glass released therefrom.

The run channel structure 20 shown in FIG. 3 is an elastic member made from an elastic material such as rubber and soft resin. The run channel structure 20 includes a run channel body 31, an inner lip 36 and an outer lip 38. The run channel body 31 is of U-shaped cross-section formed by an inner wall 32 provided on an interior side of the vehicle body 11 (FIG. 1), an outer wall 33 provided on an exterior side of the vehicle body 11, and a peak portion 34 interconnecting a top end portion 32a of the inner wall 32 and a top end portion 33a of the outer wall 33. The inner lip 36 extends from a bottom end portion 32b of the inner wall 32 towards an outer end portion 34a of the peak portion 34. The outer lip 38 extends from a bottom end portion 33b of the outer wall 33 towards an inner end portion 34b of the peak portion 34.

When an upper edge portion 21a of the door glass 21 is inserted into the run channel body 31, the inner lip 36 and the outer lip 38 guide the door glass 21 while being in a sealing engagement with the door glass 21.

The run channel structure 20 also includes a lip 41 extending from the bottom end portion 32b of the inner wall 32 inward of the vehicle body 11 with a fitting portion 42 formed at the bottom end portion 32b of the inner wall 32. The inner wall 32 has a hook-shaped projecting portion 43 disposed above the fitting portion 42. The outer wall 33 has upper and lower locking projection portions 44, 45 provided at the top and bottom end portions 33a, 33b thereof. The peak portion 34 has inner and outer lips 46, 47 provided at the inner and outer end portions 34b, 34a thereof, respectively.

The fitting portion 42 is fitted with an inner wall lower end portion 51 of the sash body 18. The hook-shaped projecting portion 43 is interlocked with an inner wall projecting portion 52 of the sash body 18. The upper locking projection portion 44 is interlocked with an outer wall step portion 53 of the sash body 18. The lower locking projection portion 45 is interlocked with an outer wall lower end portion 54 of the sash body 18.

The inner and outer lips 46, 47 are pressed against a portion 56 of the sash body 18 which faces to the peak portion 34. Such a portion 56 facing to the peak portion 34 is hereinafter referred to as "sash peak portion 56".

The run channel structure 20 includes an upper lip 58 extending obliquely outwardly of the vehicle body 11 from an intermediate portion 32c of the inner wall 32 and reaching the outer end portion 34a of the peak portion 34. The upper lip 58 is disposed above the inner lip 36 such that, when the door glass 21 abuts on the inner lip 36, the door glass 21 presses the inner lip 36 towards the inner wall 32 to thereby cause a projection 61a (a tip end) provided at a distal end portion 61 of the inner lip 36 to press the upper lip 58.

The upper lip 58 has an upper end portion 58a connected to the peak portion 34 and a lower end portion 58b connected to the intermediate portion 32c of the inner wall 32, with the upper lip 58, an upper portion 32d of the inner wall 32 and the peak portion 34 jointly defining a hollow cross-sectional portion 62 of generally triangular configuration. The upper lip 58 is convexly curved outwardly of the hollow cross-sectional portion 62.

The reason why the hollow cross-sectional portion 62 is defined by the upper lip 58, the upper portion 32d of the inner wall 32 and the peak portion 34 will be set forth later.

The peak portion 34 constituting one part of the hollow cross-sectional portion 62 has an air releasing hole 63 provided therein. By virtue of the air releasing hole 63 provided in the peak portion 34, an inner space 64 of the hollow cross-sectional portion 62 communicates with the air.

The reason why the air releasing hole 63 is provided in the hollow cross-sectional portion 62 will be set forth later.

Figure 4:
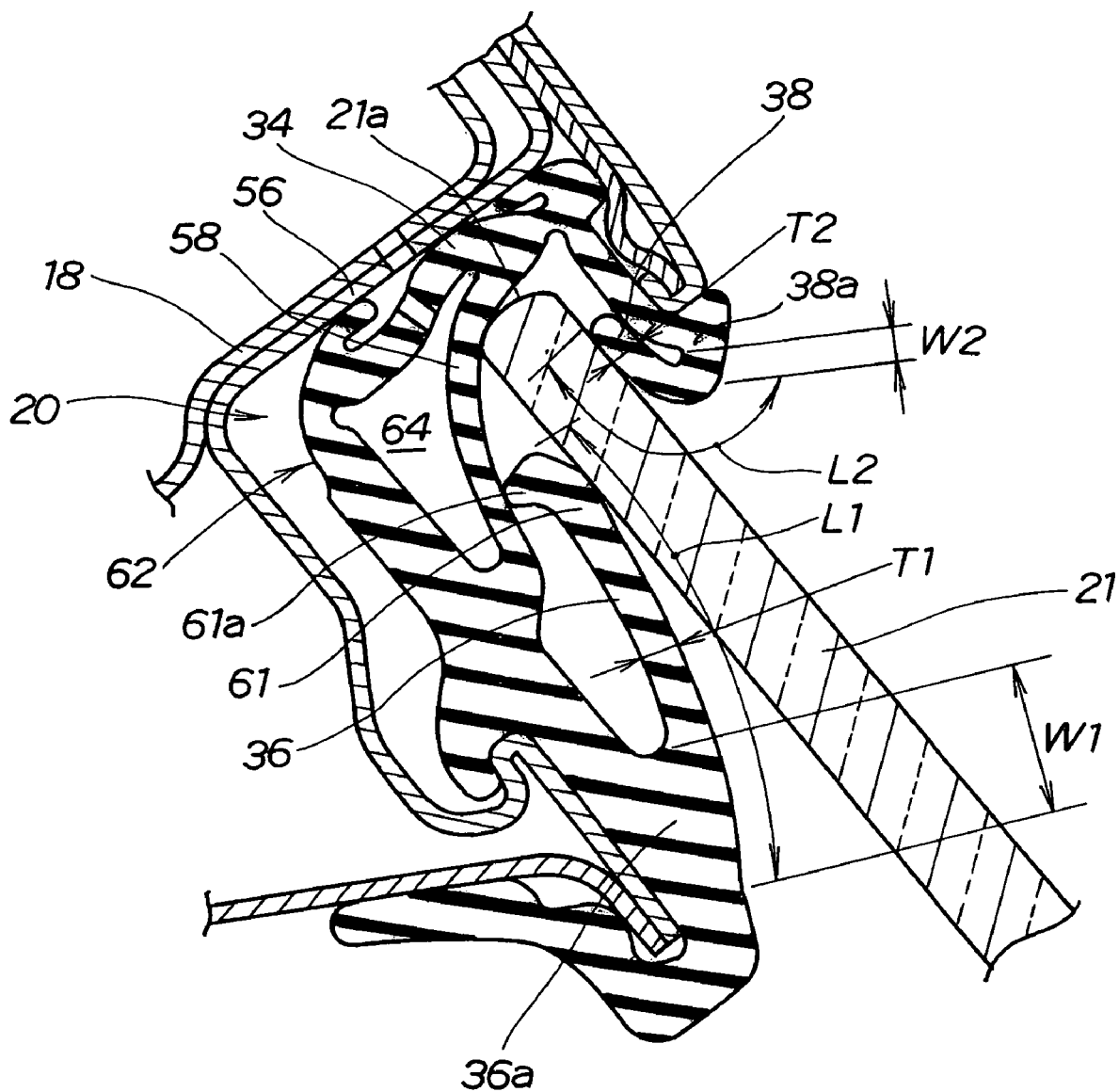
FIG. 4 is the view of FIG. 3 with the door glass inserted into the run channel structure.

FIG. 4 shows the run channel structure with the edge portion of the door glass inserted thereinto.

The door glass 21 has an inner surface pressing the distal end portion 61 of the inner lip 36 of the run channel structure 20. The door glass 21 has an outer surface pressing the outer lip 38. The upper edge portion 21a of the door glass 21 abuts on the upper lip 58 of the run channel structure 20. With this arrangement, the door glass 21 is held in the closed position.

By the door glass 21 pressing the distal end portion 61 of the inner lip 36, the projection 61a provided at the distal end portion 61 of the inner lip 36 presses the upper lip 58.

By the abutment of the upper edge portion 21a of the door glass 21 on the upper lip 58, the upper lip 58 is deformed inwardly of the hollow cross-sectional portion 62 into a concave curve configuration to thereby reduce a volume of the inner space 64 of the generally triangular hollow cross-sectional portion 62.

Additionally, by the abutment of the upper edge portion 21a of the door glass 21 on the upper lip 58, the peak portion 34 of the run channel structure 20 abuts on the sash peak portion 56.

The inner lip 36 is formed to provide a larger size than the outer lip 38. More specifically, the inner lip 36 has a proximal portion 36a having a width W1 set to be greater than a width W2 of a proximal portion 38a of the outer lip 38. The inner lip 36 has a thickness T1 set to be greater than a thickness T2 of the outer lip 38. The inner lip 36 has a length L1 set to be greater than a length L2 of the outer lip 38.

The width W1 of the proximal portion 36a, the thickness T1 and the length L1 are properly adjustable such that a reaction force to be exerted by the inner lip 36 on the door glass 21 when the door glass 21 abuts on the inner lip 36 is easy to adjust Operation of the run channel structure according to the present invention will be discussed with reference to FIG. 5A through FIG. 7C.

Figure 5A:
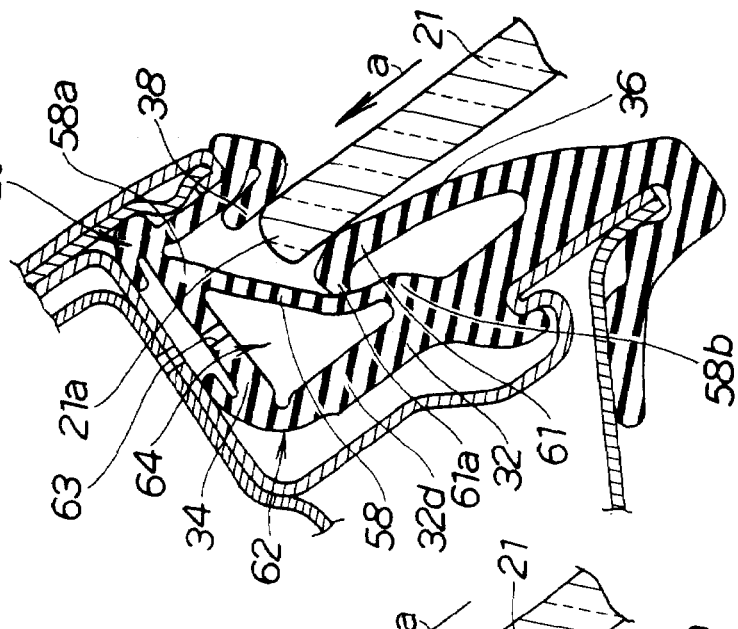
FIG. 5A through FIG. 5C are views showing the door glass being raised towards the run channel structure according to the present invention.
Figure 5B:
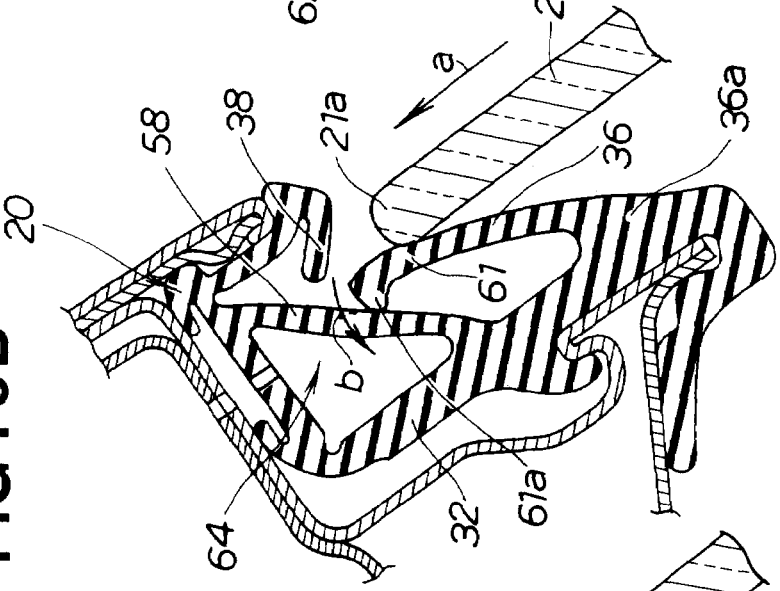
Figure 5C:
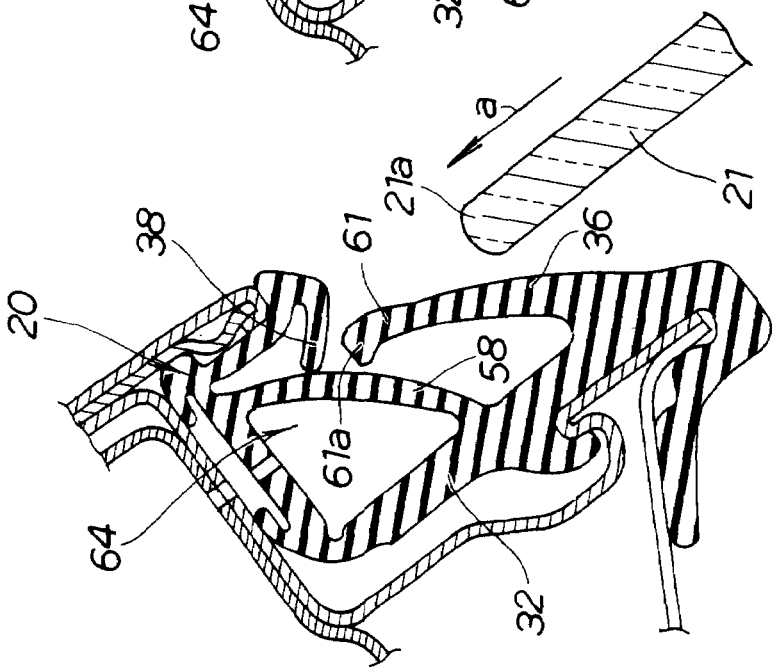

FIG. 5A through FIG. 5C show an instance in which the door glass is raised towards the run channel structure.

In FIG. 5A, an electric motor (not shown) of the window regulator is driven to move the door glass 21 upward from below the run channel structure 20, as indicated by an arrow a.

In FIG. 5B, the upper edge portion 21a of the door glass 21 abuts on the distal end portion 61 of the inner lip 36. Upon the abutment of the door glass 21 on the inner lip 36, the inner lip 36 is pressed by the door glass 21 towards the inner wall 32 of the run channel structure 20.

The distal end portion 61 of the inner lip 36 is turned on the proximal portion 36a towards the inner wall 32 of the run channel structure 20, as indicated by an arrow b, to thereby bring the projection 61a, provided at the distal end portion 61 of the inner lip 36, into abutment on the upper lip 58.

In FIG. 5C, by thus abutting on the upper lip 58, the projection 61a of the inner lip 36 presses the upper lip 58.

Because the projection 61a of the inner lip 36 presses the upper lip 58, the upper lip 58 exerts a reaction force on the projection 61a of the inner lip 36. This causes the inner lip 36 to exert a relatively large reaction force on the door glass 21, such that a speed (ascent speed) at which the door glass 21 moves upward in the direction of the arrow a is satisfactorily reduced by the reaction force of the inner lip 36. In this state, the upper edge portion 21a of the door glass 21 abuts on the outer lip 38.

Next, the reason why the hollow cross-sectional portion 62 is defined by the upper lip 58, the upper portion 32d of the inner wall 32 and the peak portion 34 will be explained.

Because the upper lip 58 is one side of the generally triangle of the hollow cross-sectional portion 62, the upper and lower end portions 58a, 58b (opposite end portions) of the upper lip 58 are supported. With this arrangement, a relatively large reaction force of the upper lip 58 is securely produced when the projection 61a of the inner lip 36 presses the upper lip 58.

In addition, because the upper lip 58 is the one side of the generally triangle of the hollow cross-sectional portion 62, an air within the inner space 64 of the hollow cross-sectional portion 62 does not flow out through the air releasing hole 63 immediately after the projection 61a of the inner lip 36 presses the upper lip 58. This arrangement increases an internal pressure within the inner space 64 of the hollow cross-sectional portion 62. The increase in internal pressure enables the upper lip 58 to act as a cushion more effectively to thereby ensure production of a relatively large reaction force of the upper lip 58.

Because the reaction force of the upper lip 58 is applied to the projection 61a of the inner lip 36, production of a sufficient reaction force to be exerted by the inner lip 36 on the door glass 21 is ensured. The reaction force of the inner lip 36 more satisfactorily reduces the ascent speed of the door glass 21.

FIG. 6A through FIG. 6C show an instance in which the upper edge portion of the door glass is inserted into the run channel structure.

In FIG. 6A, after the projection 61a of the inner lip 36 presses the upper lip 58, the upper edge portion 21a of the door glass 21 abuts on the upper lip 58.

The door glass 21 abuts on the upper lip 58 after abutting on the inner lip 36. Namely, the ascent speed at which the door glass 21 moves upward, as indicated by the arrow a, is reduced through the two steps. Accordingly, the ascent speed of the door glass 21 is more effectively reduced.

In FIG. 6B, after the door glass 21 abuts on the inner lip 36, the inner lip 36 abuts on the upper lip 58 whereupon the air within the inner space 64 of the hollow cross-sectional portion 62 flows into the air through the air releasing hole 63 and an opening portion 66 formed in the sash peak portion 56, as indicated by an arrow c.

Because the upper lip 58 has undergone a pressing force of the door glass 21 since the abutment of the door glass 21 on the upper lip 58, the upper lip 58 is sufficiently curved into a concave configuration. This causes the upper lip 58 to produce a large reaction force for satisfactorily reducing the speed (ascent speed) at which the door glass 21 moves upward in the direction of the arrow a.

Because the hollow cross-sectional portion 62 has the air releasing hole 63 communicating with the air, it becomes possible to easily adjust an increase in internal pressure of the hollow cross-sectional portion 62 which occurs when the projection 61a of the inner lip 36 presses the upper lip 58. The adjustment of the internal pressure of the hollow cross-sectional portion 62 enables adjustment of the reaction force of the inner lip 36 and adjustment of the reaction force of the upper lip 58. Therefore, the ascent speed of the door glass 21 can be satisfactorily adjusted.

For the purpose of adjustment of increase in the internal pressure of the hollow cross-sectional portion 62, the number of the air releasing holes 63 or the diameter of the air releasing hole 63 may be adjusted.

FIG. 6B shows the sash peak portion 56 having the opening portion 66 formed therein for the purpose of facilitating an understanding of the flow of the air, however, there is no need to form the opening portion 66 in the sash peak portion 56 so long as the air having flowed through the air releasing hole 63 of the hollow cross-sectional portion 62 towards the sash peak portion 56 is released into the air.

In FIG. 6C, when the door glass 21 moves further upward, the upper lip 58 is lifted up by the door glass 21. The peak portion 34 is lifted up, together with the upper lip 58, into abutment on the sash peak portion 56. This abutment of the peak portion 34 on the sash peak portion 56 prevents further upward movement of the door glass 21. At this time, a load exceeding a threshold level is applied to the window regulator (not shown) and an operation of the electric motor (not shown) of the window regulator is stopped with the result that the upward movement of the door glass 21 is stopped.

As explained above, when the door glass 21 moves to the closed position, the door glass 21 firstly abuts on the inner lip 36 and then the projection 61a of the inner lip 36 presses the upper lip 58. As a result, the reaction force of the inner lip 36 becomes relatively large. By virtue of such a relatively large reaction force of the inner lip 36, the ascent speed of the door glass 21 is satisfactorily reduced.

The upper and lower end portions 58a, 58b of the upper lip 58 are supported because the upper lip 58 is the one side of the hollow cross-sectional portion 62 of the generally triangle. This arrangement ensures the production of the relatively large reaction force of the upper lip 58.

When the projection 61a of the inner lip 36 presses the upper lip 58, the internal pressure of the hollow cross-sectional portion 62 increases. This causes the upper lip 58 to act as a cushion more effectively for producing a relatively large reaction force. Accordingly, the ascent speed of the door glass 21 is satisfactorily reduced by the reaction force of the inner lip 36.

Next, the upper edge portion 21a of the door glass 21 abuts on the upper lip 58. After the door glass 21 abuts on the inner lip 36, the inner lip 36 abuts on the upper lip 58. Therefore, the ascent speed at which the door glass 21 moves upward as indicated by the arrow a is reduced through the two steps. As a result, the ascent speed of the door glass 21 is satisfactorily reduced.

At this time, the air within the inner space 64 of the hollow cross-sectional portion 62 flows into the air. Then, the upper lip 58 is sufficiently curved into a concave configuration for producing a large reaction force. Thus, the ascent speed of the door glass 21 is reduced more satisfactorily and the upper edge portion 21a of the door glass 21 abuts on the peak portion 34 with the peak portion 34 abutting on the sash peak portion 56. Therefore, "glass strike sound", namely, a sound produced when the upper edge portion 21a of the door glass 21 abuts on the peak portion 34 of the run channel structure 20 can be reduced.

Figure 7A:
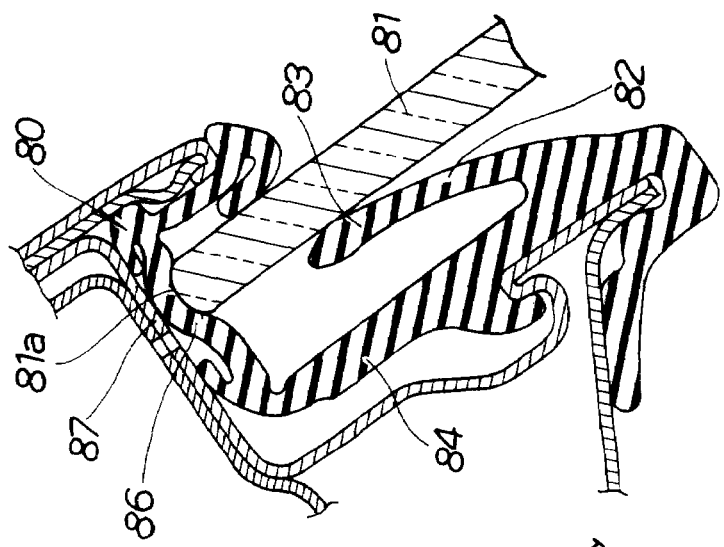
FIG. 7A through FIG. 7C are views showing how a door glass is inserted into a run channel structure in a comparative example.
Figure 7B:
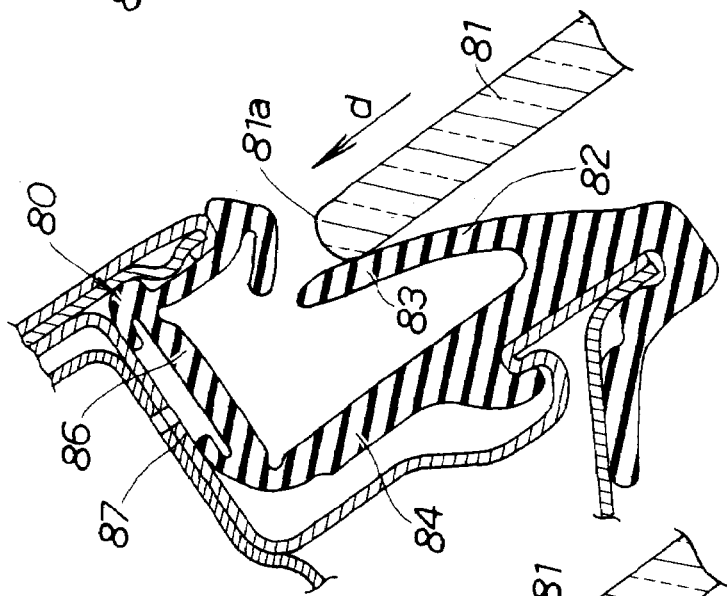
Figure 7C:
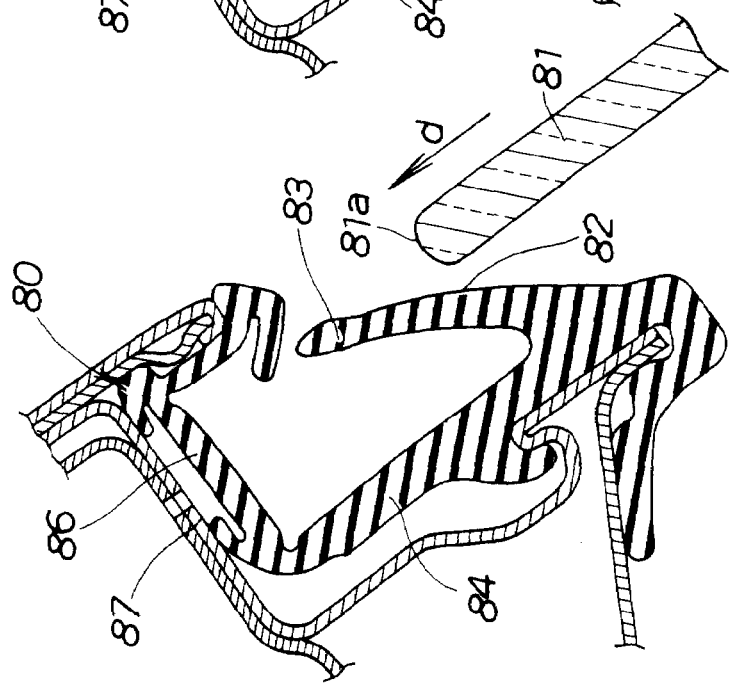

FIG. 7A through FIG. 7C show an instance in which an upper edge portion 81a of a door glass 81 is inserted into a run channel structure 80 such as provided in a comparative example. The run channel structure 80 in this comparative example is the run channel structure 20 of the present invention, but with selected structural features removed including the upper lip 58, the air releasing hole 63, and the projection 61a structures (see FIGS. 3 and 4) to help facilitate discussion of some advantages of the present invention over the comparative example.

As shown in FIG. 7A, an electric motor (not shown) of a window regulator is driven to raise the door glass 81 from below the run channel structure 80 of the comparative example, as indicated by an arrow d.

As shown in FIG. 7B, the upper edge portion 81a of the door glass 81 abuts on a distal end portion 83 of an inner lip 82. Upon the abutment of the door glass 81 on the inner lip 82, the inner lip 82 is pressed by the door glass 81 towards an inner wall 84 of the run channel structure 80 of the comparative example. In this state, a reaction force of the inner lip 82 is applied to the door glass 81.

This reaction force of the inner lip 82 is less large relative to the preferred embodiment of the invention because the distal end portion 83 of the inner lip 82 is a free end. Accordingly, the reaction force of the inner lip 82 is insufficient to satisfactorily reduce an ascent speed of the door glass 81.

As shown in FIG. 7C, the upper edge portion 81a of the door glass 81 comes into abutment on a peak portion 86 of the run channel structure 80 of the comparative example at a relatively high speed as compared against the preferred embodiment of the invention. The peak portion 86 is pushed upward by a pressing force of the door glass 81 into abutment on a sash peak portion 87. This abutment of the peak portion 86 on the sash peak portion 87 prevents the door glass from moving further upward. At this time, a load exceeding a threshold level is applied to the window regulator (not shown) to thereby stop an operation of the electric motor (not shown) of the window regulator with the result that the door glass 81 stops moving upward.

As discussed above, the upper edge portion 81a of the door glass 81 abuts on the peak portion 86 of the run channel structure 80 at the relatively high speed as compared against the preferred embodiment of the invention. Thus, it is difficult using structure of the comparative example such as shown in FIG. 7A through FIG. 7C to reduce "glass strike sound", that is, a sound produced when the upper edge portion 81a of the door glass 81 abuts on the peak portion 86 of the run channel structure 80.

Although the present invention has been described as being applied to the run channel structure 20 of the right front sash door 13 in the illustrated embodiment, the run channel structure 20 is also applicable to the left front sash door 12 or the left and right rear sash doors 14, 15 in the same manner.

Although in the illustrated embodiment, the projection 61a is provided at the distal end portion 61 of the inner lip 36 and the projection 61a presses the upper lip 58, the distal end portion 61 of the inner lip 36 may not have the projection 61a and may press the upper lip 58.

Obviously, various minor changes and modifications of the present invention are possible in the light of the above teaching. It is therefore to be understood that within the scope of the appended claims the invention may be practiced otherwise than as specifically described.

What is claimed is:

1. A run channel structure for guiding relative movement between the run channel structure and an associated door glass, the run channel structure comprising:

a run channel body having a generally U-shaped cross-section, the run channel body including an inner wall, an outer wall and a peak portion inter-connecting top end portions of the inner and outer walls;

an inner lip extending from a bottom end portion of the inner wall towards the peak portion;

an outer lip extending from a bottom end portion of the outer wall towards the peak portion;

an upper lip disposed above the inner lip and extending from an intermediate portion of the inner wall to the peak portion;

a projection disposed on a distal end portion of said inner lip and directed towards said upper lip; and a sash peak portion;

wherein, when the associated door glass abuts on the inner lip during said relative movement between the associated door glass and the run channel structure, the associated door glass presses the inner lip towards the inner wall to cause the projection on the distal end portion of the inner lip to press the upper lip, whereby a reaction force is exerted on the associated door glass through the projection and the inner lip to reduce a speed of said relative movement, wherein the upper lip, the inner wall and the run channel body peak portion jointly define a hollow cross-sectional portion having a generally triangular configuration, wherein the run channel body peak portion has an air releasing hole extending therethrough, wherein the run channel body is mounted on said sash peak portion, said sash peak portion having an air releasing opening portion extending therethrough, and wherein air flows into and out of an inner space of the hollow cross-sectional portion through said air releasing hole and said air releasing opening portion as said hollow cross-sectional portion expands and contracts.

2. The run channel structure according to claim 1, wherein an upper edge portion of the door glass is adapted to abut on the upper lip after pressing the projection of the inner lip on the upper lip.

3. The run channel structure according to claim 1, wherein the inner lip has a greater size than the outer lip produces a reaction force to be applied to the door glass when the door glass abuts on the inner lip.

4. A run channel structure for guiding relative movement between the run channel structure and an associated door glass, the run channel structure comprising:
   a run channel body having a generally U-shaped cross-section, the run channel body including an inner wall, an outer wall and a peak portion inter-connecting top end portions of the inner and outer walls;
   an inner lip extending from a bottom end portion of the inner wall towards the peak portion;
   an outer lip extending from a bottom end portion of the outer wall towards the peak portion;
   an upper lip disposed above the inner lip and extending from an intermediate portion of the inner wall to the peak portion adjacent the top end portion, the upper lip intersects with the peak portion of the outer wall, the upper lip, the inner wall and the peak portion jointly forming a hollow cross-sectional portion having a generally triangular configuration, the peak portion having an air releasing hole extending therethrough; and,
   a sash peak portion having an air releasing opening portion extending therethrough;

wherein, when the associated door glass abuts on the inner lip during said relative movement between the associated door glass and the run channel structure, the associated door glass presses the inner lip towards the inner wall to cause a distal end portion of the inner lip to contact and press the upper lip, whereby a reaction force based on an internal pressure of the hollow cross-sectional portion is exerted on the associated door glass through the contact between the upper lip and the distal end portion of the inner lip to reduce a speed of said relative movement, and wherein the run channel body is mounted on said sash peak portion such that air flows into and out of an inner space of the hollow cross-sectional portion through said air releasing hole and said air releasing opening portion as said hollow cross-sectional portion expands and contacts.

5. The run channel structure according to claim 4, further including:
   a projection on the distal end portion of said inner lip, said projection directed towards said upper lip.

6. The run channel structure according to claim 5, wherein the inner lip has a greater size than the outer lip and produced a reaction force to be applied to the door glass when the door glass abuts on the inner lip.

7. The run channel structure according to claim 5, wherein an upper edge portion of the door glass is adapted to abut the upper lip after pressing the projection of the inner lip on the upper lip.

8. The run channel structure according to claim 4, wherein an upper edge portion of the door glass is adapted to abut the upper lip after pressing the distal end portion of the inner lip on the upper lip.

9. The run channel structure according to claim 4, wherein the inner lip has a greater size than the outer lip and produces a reaction force to be applied to the door glass when the door glass abuts on the inner lip.

* * * * *

UNITED STATES PATENT AND TRADEMARK OFFICE
CERTIFICATE OF CORRECTION

| | |
|---|---|
| PATENT NO. | : 7,487,615 B2 |
| APPLICATION NO. | : 11/048980 |
| DATED | : February 10, 2009 |
| INVENTOR(S) | : Watanabe et al. |

It is certified that error appears in the above-identified patent and that said Letters Patent is hereby corrected as shown below:

Column 9, Line 28, (Claim 3, Line 2), after "lip" (second occurrence) insert --and--.

Column 10, Line 29, (Claim 6, Line 2), delete "produced" and insert --produces--.

Signed and Sealed this

Twenty-first Day of April, 2009

JOHN DOLL
*Acting Director of the United States Patent and Trademark Office*